United States Patent [19]

Ginzburg

[11] Patent Number: 4,674,310
[45] Date of Patent: Jun. 23, 1987

[54] STRIP TENSION PROFILE APPARATUS AND ASSOCIATED METHOD

[75] Inventor: Vladimir B. Ginzburg, Pittsburgh, Pa.

[73] Assignees: Wean United Rolling Mills, Inc.; International Rolling Mill Consultants, Inc., both of Pittsburgh, Pa.

[21] Appl. No.: 818,838

[22] Filed: Jan. 14, 1986

[51] Int. Cl.⁴ .............. B21B 37/06; B21B 37/04; G01L 5/04

[52] U.S. Cl. .......................... 72/17; 72/205; 73/159; 73/862.07

[58] Field of Search .......... 72/17, 205, 20, 21; 73/159, 862.07, 862.45, 862.46, 862.47

[56] References Cited

U.S. PATENT DOCUMENTS

| | | |
|---|---|---|
| 2,345,132 | 3/1944 | Lessmann et al. ........... 73/862.07 X |
| 2,569,264 | 9/1951 | Stone et al. ........................ 242/75 |
| 3,334,508 | 8/1967 | Martin ..................... 73/862.07 X |
| 3,475,935 | 11/1969 | Kajiwara ........................... 72/9 |
| 3,499,306 | 3/1970 | Pearson ........................... 72/17 |
| 3,526,114 | 9/1970 | Wistreich . |
| 3,581,536 | 6/1971 | Terwilliger ......................... 72/9 |
| 3,756,050 | 9/1973 | Kubo et al. ......................... 72/9 |
| 3,817,095 | 6/1974 | Diolot ............................... 73/159 |
| 3,902,363 | 9/1975 | Ishimoto ......................... 73/159 |
| 3,961,510 | 6/1976 | Kovack ............................. 72/20 |
| 4,004,459 | 1/1977 | Greenberger ............ 73/862.07 X |
| 4,116,029 | 9/1978 | Fabian et al. ...................... 72/34 |
| 4,188,809 | 2/1980 | Ishimoto et al. .................. 72/17 |
| 4,289,005 | 9/1981 | Cabaret et al. ................... 72/12 |
| 4,332,154 | 6/1982 | Norduall ........................... 72/31 |
| 4,463,586 | 8/1984 | Griffin .............................. 72/17 |
| 4,512,170 | 4/1985 | Hsu .................................. 72/17 |

FOREIGN PATENT DOCUMENTS 59-1013 6/1984 Japan .

Primary Examiner—Robert L. Spruill
Assistant Examiner—Steve Katz
Attorney, Agent, or Firm—Arnold B. Silverman; Suzanne Kikel

[57] ABSTRACT

A rolling mill strip tension controlling apparatus may also function as a looper roll and shape meter and is provided with a plurality of generally aligned axially rotatable strip contacting rolls which are supported on rotating arms which in turn are rotated by actuators such as hydraulic cylinders. By monitoring actuator pressure and position a difference between the actual values for position or pressure and the predetermined values is used to provide through a servomechanism suitable corrective action on an individual roll by roll basis. A switch may be provided to permit the system to provide information from a computer to the servo system in a position mode or a pressure mode. The measured values may take the form of oscillations with respect to a predetermined base value.

35 Claims, 6 Drawing Figures

STRIP TENSION PROFILE APPARATUS AND ASSOCIATED METHOD

BACKGROUND OF THE INVENTION

1. Field Of The Invention

This invention relates to apparatus and associated method for determining tension of a rolling mill strip at discrete transverse locations on the strip and providing corrective action where portions of the tension profile depart from predetermined desired levels.

2. Description Of The Prior Art

It has been known in connection with the monitoring of tension in metallic strip in rolling mills to employ an axially rotatable roll which is in contact with the strip and urges the strip out of a planar path of travel. In such systems, it has been known to obtain information regarding the tension in the strip and to make adjustments to the roll position based upon such information. See generally U.S. Pat. Nos. 2,569,264 and 3,961,510.

It has been known in the rolling mill environment to monitor strip tension or flatness by measuring forces across a roll or a segmented group of rolls. See generally U.S. Pat. Nos. 3,475,935; 4,289,005; 4,512,170; and Japan No. 59-1013.

U.S. Pat. Nos. 3,581,536 and 4,332,154 disclose segmented roll, contacting sensor systems.

U.S. Pat. No. 4,116,029 discloses a device which has high inertia rolls and would require prolonged mill shutdown in order to replace the transducers.

U.S. Pat. No. 4,188,809 discloses a segmented roll, noncontacting system wherein the roll surface which is subject to wear is employed as a reference for the sensor. This could interfere with the accuracy of measurement.

See, generally, Proceedings Vol. 1, International Conference on Steel Rolling (Science and Technology of Flat Rolled Products) Sept. 29/Oct. 4, 1980 —Tokyo, Japan, published by the Iron Institute of Japan.

U.S. Pat. No. 3,817,095 discloses a device for detecting and correcting strip defects wherein a strip contacting roll, which may be segmented, engages the strip and a pair of rotatable wheels which are operatively associated with hydraulic cylinders. It provides no disclosure of the handling of hydraulic fluid in a control mode. See also U.S. Pat. Nos. 3,499,306; 3,526,114; and 4,463,586.

In spite of the known prior art practices, there is lacking an effective means for controlling strip tension profile in an economical and rapid manner.

SUMMARY OF THE INVENTION

The present invention has solved the above-described problem.

In the apparatus and method of the present invention a plurality of rolls in predetermined relative axial relationship are axially rotatable and are secured to support arms which are rotatable responsive to movement of the piston of an associated hydraulic or pneumatic cylinder. As to each of the rolls, first sensing means monitor the cylinder position and other sensing means monitor cylinder pressure. A computer processes this information and depending upon whether the system is operating in the roll position mode or strip tension mode permits feedback to a regulator which in turn initiates operation of a servomechanism which may include a servovalve and associated hydraulic or pneumatic cylinder. This servomechanism makes the desired correction to the particular roll.

The apparatus, if desired, may be employed to monitor the strip tension within a plurality of strip zones without the servomechanism. The information could also be used to adjust roll gap in a mill stand, automatically or by an operator.

In a further refinement of the invention the values for position and pressure which are monitored are the oscillations from a predetermined base value for a position and pressure.

It is an object of the present invention to provide apparatus and a method suitable for use in a looper roll, a tensiometer and/or a shapemeter wherein individual control of strip tension in local sections may be determined or adjusted independently of other sections.

It is a further object of the present invention to provide such a system which is adapted to operate on the basis of functions of strip tension in either a first mode which employs cylinder position or a second mode which employs cylinder pressure or both.

It is an object of the present invention to provide an effective means of employing tension profile to control metal strip shape in a rolling mill.

It is a further object of the present invention to provide such a system which has increased sensitivity at a reduced ratio of noise to useful signal.

It is a further object of the present invention to determine strip tension at a plurality of rolls extending across the strip.

It is a further object of the present invention to provide for substitution in control units of electronics for mechanical devices.

These and other objects of the invention will be more fully understood from the following description of the invention on reference to the illustrations appended hereto.

DESCRIPTION OF THE PREFERRED EMBODIMENTS

Figure 1:
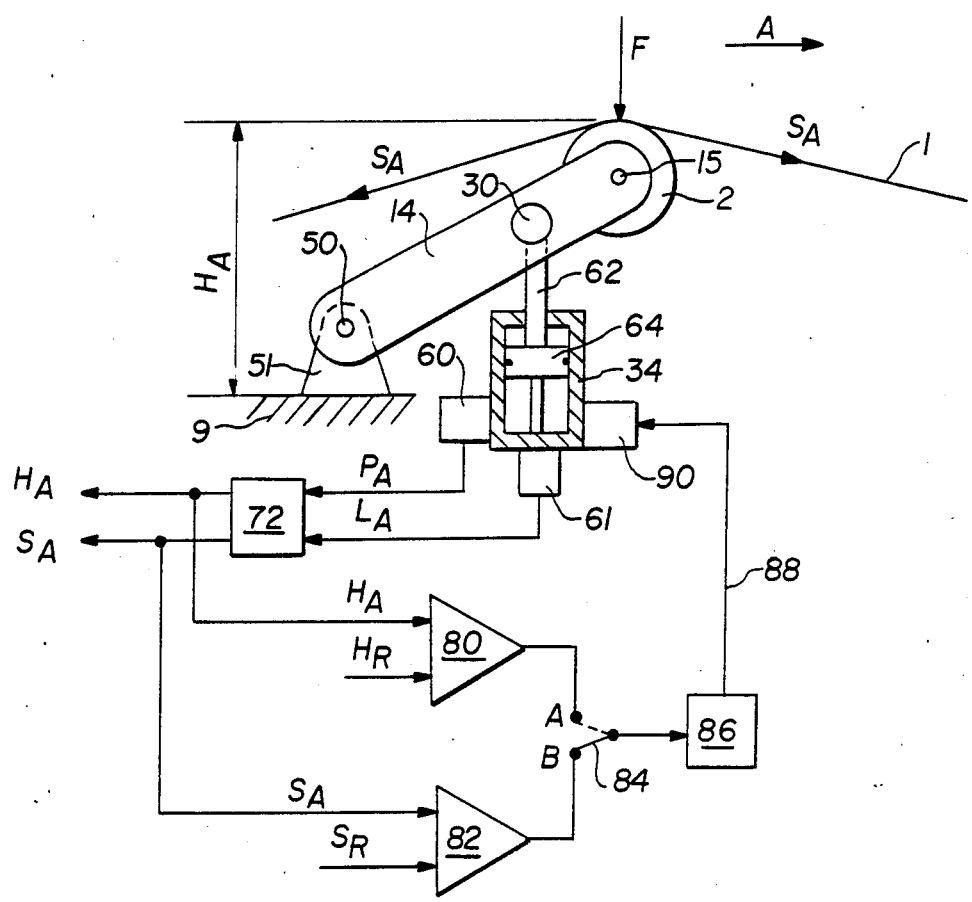
FIG. 1 is a schematic illustration showing a first embodiment of the apparatus of the present invention.
Figure 2:
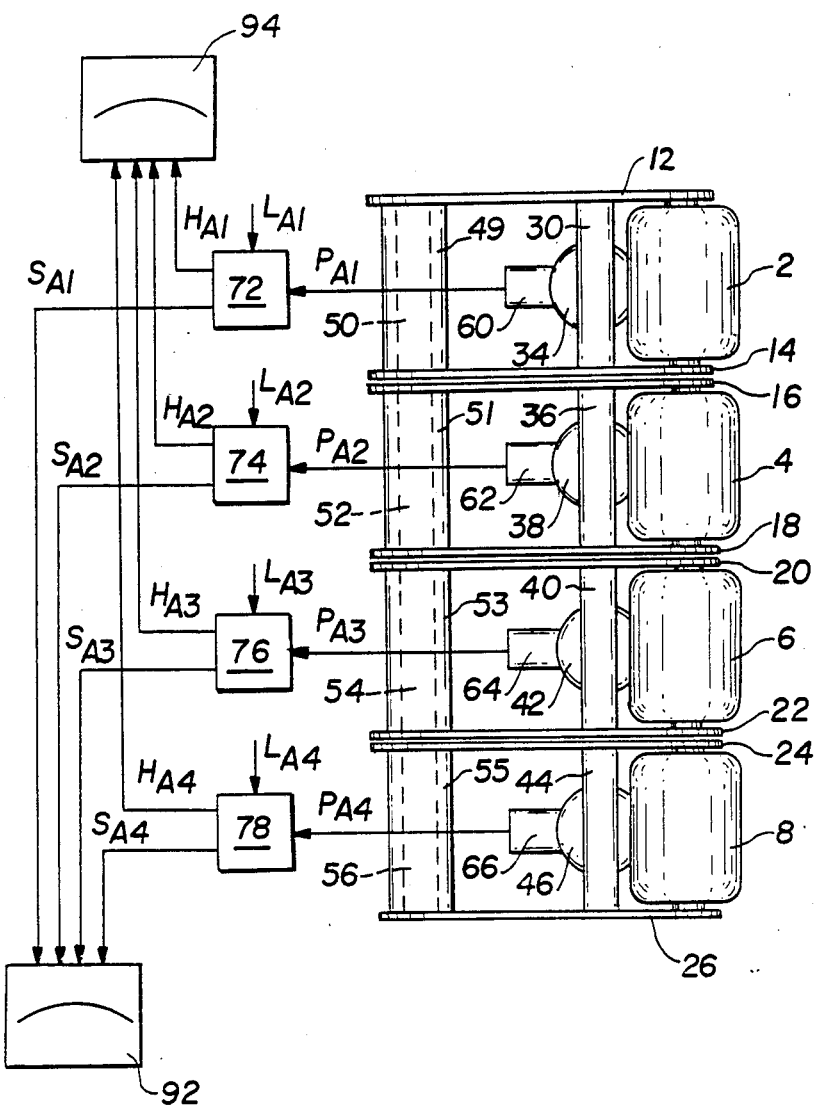
FIG. 2 is a schematic top plan view showing portions of the invention wherein four strip contacting rolls and visually perceptible monitoring means are employed.

Referring in greater detail to FIGS. 1 and 2, it will be appreciated that the present invention contemplates providing a segmented strip contacting roll which will have each roll segment individually adjustable. By operating in either a roll position or strip tension mode the hydraulic cylinder operatively associated with a particular roll in a manner to be described hereinafter provides the desired position or pressure information and by means of a servomechanism effects individual adjustment to the strip contacting roller when a predetermined departure from a preexisting standard occurs.

The rolls 2,4,6,8 are preferably positioned in relative, predetermined axial relationship. The rolls, for example, may be generally coaxial or may cooperate to define an arch-like configuration or any other desired relative positions. Roll 2 is supported by support arms 12,14. The support arms 12,14 are fixedly secured to cross member 49 which rotates about shaft 50. Cross member 30 is fixedly secured to support arms 12,14 and overlies hydraulic cylinder 34 which has its free end of its piston arm secured to the underside of cross member 30. Similarly, roll 4 has support arms 16,18, cross member 51 which rotates about shaft 52 and cross member 36 which overlies hydraulic cylinder 38. Roll 6 is axially rotatable with respect to support arms 20,22 which has cross member 53 rotating about shaft 54 and cross member 40 overlying hydraulic 42. Roll 8 is rotatable axially with respect to support arms 24,26 and has cross arm 55 which rotates about shaft section 56 and cross member 44 which overlies hydraulic cylinder 46. Operatively associated with the cylinders 34,38,42,46, respectively, which are preferably double acting cylinders, are pressure transducers 60,62,64,66, the operation of which will be described in greater detail hereinafter.

With particular emphasis on FIG. 1 there is shown roll 2 over which strip 1 which may be steel or aluminum, for example, having a tension $S_A$ passes in the direction indicated by arrow A. The tension in the strip 1 applies a downward force against roll 2 generally indicated by arrow F. The arms 12,14 support a shaft 15 about which roll 2 rotates with the cross member 30 rotatably secured to underlying hydraulic cylinder piston rod 62. The cross member 30 is positioned between shaft 15 and shaft 50. The strip where it contacts roll 2 has a height $H_A$ with respect to a reference surface which in this instance is support 9 which is secured by support base 51 which may be of any desired type.

It will be appreciated that as piston 64 of cylinder 34 reciprocates, the arms 12,14 will be caused to rotate about shaft 50. The roll 2, therefore, may be subjected to both axial rotation about its own longitudinal axis and rotation about shaft 50 as a result of its securement to arms 12,14. Pressure transducer 60 measures the pressure of the hydraulic fluid within hydraulic cylinder 34 and produces an output $P_A$ which is the actual pressure. Output $P_A$ is introduced into computer 72. Position transducer 61 monitors the position of the piston 64 within the cylinder 34 and emits a signal $L_A$ to computer 72. Computer 72 calculates roll position $H_A$ as a function of the cylinder position signal $L_A$. It also calculates strip tension $S_A$ as a function of the pressure transducer signal $P_A$ and cylinder position signal $L_A$. Also input into position regulator means 80 is the roll position reference $H_R$. When switch 84 is in the A position a corrective signal is emitted to the servo valve controller 86. This in turn emits a signal over line 88 to servo valve 90 which makes a corresponding correction to the hydraulic cylinder position. Responsive to the corrective adjustment to the cylinder position, the roll 2 will have a responsive movement upward or downward thereby altering position $H_A$ for that particular roll. This roll position mode is one of two modes of operation which the present invention is adapted to employ.

In the second mode, the strip tension mode, actual strip tension signal $S_A$ and the strip tension reference signal $S_R$ are introduced into strip tension regulator means 82. When switch 84 is in the B position thus permitting the system to function in the strip tension mode, a corrective signal is introduced into servo valve controller 86 which is carried by lead 88 to servo valve 90 to effect the desired change in the hydraulic cylinder pressure. Responsive to the cylinder pressure, the roll 2 will have a responsive movement upward or downward thereby altering the strip tension $S_A$ with respect to each roll.

It will be appreciated, therefore, that in either mode, the present system provides an effective means for monitoring strip tension within a particular longitudinal zone contacted by one of the rollers and through means of a servomechanism effects a desired adjustment when a predetermined departure from a reference level has been achieved.

Referring once again to FIG. 2, it will be appreciated that while four rolls 2,4,6,8 are illustrated, a greater or lesser number may be employed as desired. This figure shows the pressure signals $P_{A1}$, $P_{A2}$, $P_{A3}$, $P_{A4}$ being introduced along with the position signals $L_{A1}$, $L_{A2}$, $L_{A3}$ and $L_{A4}$, respectively, into the computer units 72,74,76,78. The output signals, in addition to being introduced into the position regulator means 80 and strip tension regulator means 82 as shown in FIG. 1 may also be introduced into computing and display means 92,94 which provide a visual indication as a function of the roll position or strip tension values. Visual means may take the form of any desired means such as cathode ray tubes, meters or other means. Alternatively, if desired, the values may be recorded or stored in addition to or in lieu of being displayed. In the position mode, the strip tension distribution will be displayed by the computing and display means 92 utilizing strip tension signals $S_A$. In the strip tension mode, the strip tension distribution will be displayed by the computing and visual display means 94 utilizing the roll position signals $H_A$.

Figure 3:
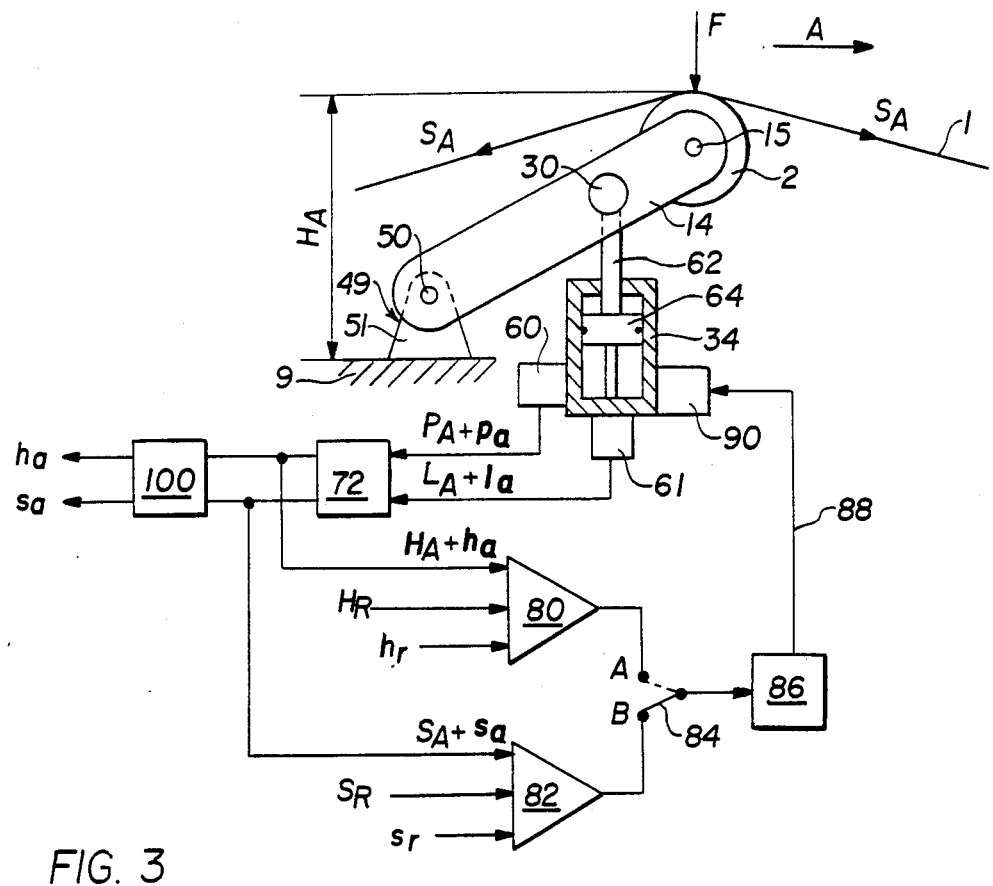
FIG. 3 is a schematic illustration of the invention as shown in FIG. 1 with an additional property being considered.
Figure 4:
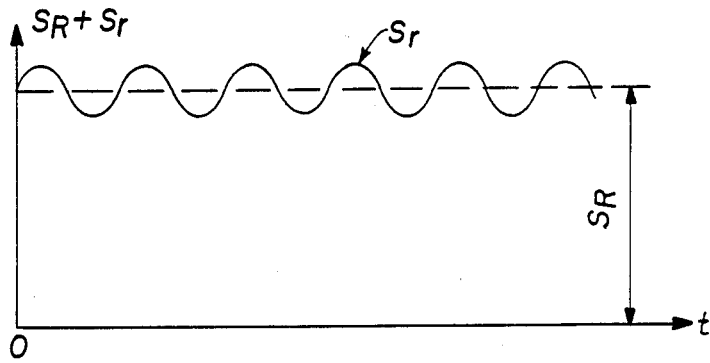
FIGS. 4 and 5 show, respectively, plots of base line values of strip tension and cylinder position with oscillations relating thereto.
Figure 5:
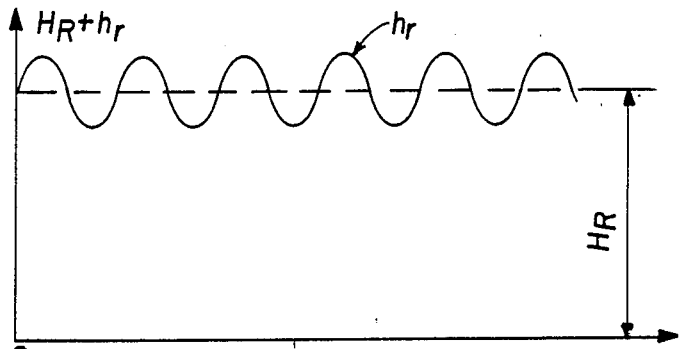

Referring to FIGS. 3 through 5, a further refinement of the invention will be considered. In this embodiment of the invention in order to increase sensitivity and decrease the ratio of noise to useful signals as well as substantially reducing the undesired effect of friction in the seal. Introduction of the oscillations replaces static friction with dynamic friction which is much smaller in magnitude. This substantially reduces hysteresis of the system and increases its resolution. It is contemplated that the base reference magnitude will be established and that emphasis will be placed upon monitoring oscillatory departures from that level. As is shown in FIGS. 3 and 4, for example, in the strip tension mode, the strip tension reference consists of the basic component $S_R$ and the oscillatory component $s_r$. In this mode, the basic component of the reference $S_R$ will be balanced by the basic component of the actual strip tension signal $S_A$. Similarly, the oscillatory component of the reference $s_r$ will be balanced by the oscillatory strip tension component $s_a$.

As is shown in FIGS. 3 and 5, in the position mode, the roll position reference consists of the basic component $H_R$ and the oscillatory component $h_r$. These components will be balanced, respectively, by the basic component of actual roll position signal $H_A$ and by oscillatory component of actual roll position signal $h_a$. In the process of balancing the oscillatory components of the reference signals $s_r$ and $h_r$, the cylinder pressure and cylinder position will oscillate with amplitudes $p_a$ and $l_a$, correspondingly. As is shown in FIG. 3, the oscillatory values of $h_r$ and $s_r$ are introduced respectively into the position regulating means 80 and strip tension regulating means 82 to facilitate use of the desired oscillations. It will generally be advantageous to employ a sinusoidal wave as $s_r$ and $h_r$. In addition to the previously described system, there is provided a discriminator 100 which provides to computing and visual display means such as 92 and 94 the signals for the actual oscillatory readings $h_a$, $s_a$.

In the roll position mode, the roll position will oscillate with the amplitude and frequency determined by the oscillating component of the position reference $h_r$. In that case the amplitude of the oscillating component of the strip tension will be a function of strip tension. Similarly, in the strip tension mode, the strip tension in the portion of the strip which contacts each roll will oscillate with the amplitude and frequency determined by the oscillating component of strip tension reference $s_r$. In that case the amplitude of the oscillations component of the roll position will be a function of strip tension.

Figure 6:
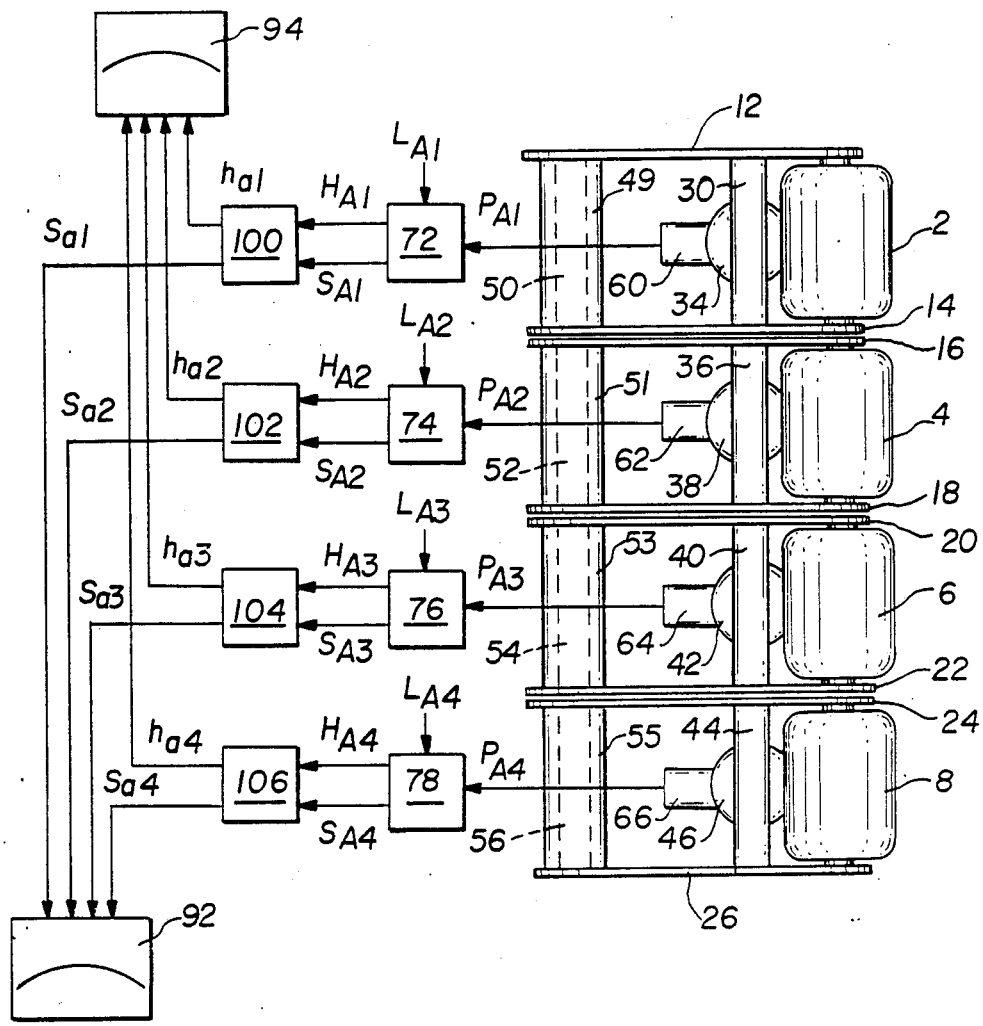
FIG. 6 is a schematic illustration of the form of the invention having visually perceptible monitoring means.

FIG. 6 illustrates the four rolls 2,4,6,8 employing the system shown and described in connection with FIGS. 3 through 5. The discriminators 100,102,104,106 serve to provide indications to computing and visual display means 92,94.

When the roll position mode is in use, the strip tension distribution will be displayed by the computing and visual display means 92 utilizing the oscillatory components of strip tension signals $s_a$. In the pressure mode the strip tension distribution will be displayed by the computing and visual display means 94 utilizing the oscillatory components of the roll position $h_a$.

As it will be appreciated that because only oscillatory components of either roll position or strip tension will be used for evaluation of the strip tension distribution, the detrimental effects of variation of the basic components $H_A$ and $S_A$ due to, for example, zero drift or temperature variation will be substantially diminished. Also, because only the signals which coincide in frequency with that of the oscillation components of the reference signals will be measured, the noise level will be substantially reduced.

It will be appreciated that the present invention, therefore, provides an efficient means of operating in a roll position mode, a strip tension mode or both and that individualized control of the plurality of generally axially aligned rolls is achieved. This may be employed in a looper roll, a tensiometer or a shapemeter, as desired. The apparatus and associated method are suitable for use in hot mills or cold mills. All of this is accomplished in a highly automated, rapid, economic and efficient manner.

While reference has made herein to the use of servomechanisms to adjust the position of the rolls of the apparatus disclosed herein, the invention may be used in a passive mode to provide the information or to adjust a mill stand roll gap, for example.

While express disclosure has been made herein of the preferred use of hydraulic cylinders as actuator means for individually positioning the rolls, it will be appreciated that pneumatic cylinders or other forms of actuators may be employed, if desired.

It will be appreciated that in many instances achieving the desired uniform strip tension will best be accomplished by either roll position mode or strip tension mode providing different settings for at least some of the rolls. This is readily accomplished by the individual roll control of the present invention.

Whereas particular embodiments of the invention have been described above for purposes of illustration, it will be evident to those skilled in the art that numerous variations of the details may be made without departing from the invention as defined in the appended claims.

I claim:
1. Rolling mill strip tension apparatus comprising
   a plurality of axially rotatable strip contacting rolls for contacting portions of said strip across said strip,
   support means for supporting said rolls,
   actuator means for each of said rolls for individually positioning said rolls,
   position sensing means for determining the position of said actuator means and emitting a corresponding position signal,
   pressure sensing means for determining the pressure in said actuator means and emitting a corresponding pressure signal,
   computer means for receiving said position signals and said pressure signals and determining the strip tension signals profile and position signals from said strip contacting rolls,
   said computer means having a first mode which provides predetermined positions of the strip contacting rolls and determines the strip tension profile as a function of said strip tension signals and a second mode which provides predetermined strip tension for each contacting roll and determines strip tension profile as a function of the positions of said strip contacting rolls, and
   servo means for adjusting the position of said actuator means when a predetermined tension does not exist in said strip portions adjacent said rolls.
2. The rolling mill strip tension apparatus of claim 1 including
   said strip contacting rolls being disposed in predetermined relative axial relationship.
3. The rolling mill strip tension apparatus of claim 2 including
   said actuator means having hydraulic cylinder means.
4. The rolling mill strip tension apparatus of claim 3 including
   said servo means having means for adjusting the position and pressure of said hydraulic cylinder means.
5. The rolling mill strip tension apparatus of claim 1 including
   said position sensing means having a position transducer.
6. The rolling mill strip tension apparatus of claim 5 including
   said pressure sensing means having a pressure transducer.
7. The rolling mill strip tension apparatus of claim 6 including
   switch means for providing said servo means with either a signal from said computer in said first mode or a signal from said computer in said second mode.
8. The rolling mill strip tension apparatus of claim 7 including
   position regulator means providing an output to said servo means through said switch means when said switch means is in a first mode position.
9. The rolling mill strip tension apparatus of claim 8 including
   strip tension regulator means for providing output to said servo means when said switch means is in a second position.

10. The rolling mill strip tension apparatus of claim 9 including
    said servo means having servo valve means for controlling the hydraulic pressure in said hydraulic cylinder responsive to receipt of a correction signal from said position regulator means or said strip tension regulator means.

11. The rolling mill strip tension apparatus of claim 1 wherein
    spaced roll support means support each said roll for axial rotation.

12. The rolling mill strip tension apparatus of claim 11 including
    said roll support means includes arms mounted for rotational movement about a pivot member, whereby said rolls may be rotated axially and rotated with rotation of said support arms.

13. The rolling mill strip tension apparatus of claim 7 including
    the piston rods of said hydraulic cylinders being operatively associated with said pair of roll support arms such that movement of said piston will effect responsive rotational movement of said arms about said pivot members.

14. The rolling mill strip tension apparatus of claim 13 wherein
    said rolls are substantially coaxial.

15. The rolling mill strip tension apparatus of claim 13 including
    a cross member secured to at least one of each pair of said support arms, and
    said piston rods being rotatably secured to said cross members.

16. The rolling mill strip tension apparatus of claim 15 including
    said cross members being disposed between said pivot member and the axes of said rolls.

17. The rolling mill strip tension apparatus of claim 8 including
    said position regulator means having means for comparing an actual roll position value with a predetermined roll position value and emitting a corrective signal to effect an actual roll position value equal to a predetermined position value.

18. The rolling mill strip tension apparatus of claim 17 including
    said strip tension regulating means having means for comparing an actual strip tension value with a predetermined strip tension value and emitting a corrective signal to effect an actual strip tension value equal to a predetermined strip tension value.

19. The rolling mill strip tension apparatus of claim 18 wherein
    said position regulating means has means for providing oscillation of actual roll position with respect to a predetermined base value.

20. The rolling mill strip tension apparatus of claim 19 including
    discriminating means for discriminating the oscillatory component of the actual roll position signal.

21. The rolling mill strip tension apparatus of claim 20 wherein
    said strip tension regulating means has means for providing the oscillation of actual strip tension with respect to a predetermined strip tension base level.

22. The rolling mill strip tension apparatus of claim 21 including
    discriminating means for discriminating the oscillatory component of the actual strip tension signal.

23. The rolling mill strip tension apparatus of claim 21 including
    computing and display means for providing a visual indication of the strip tension in a generally transverse direction as a function of the oscillatory components of the actuat roll position signals.

24. The rolling mill strip tension apparatus of claim 23 including
    computing and display means for providing a visual indication of the strip tension distribution as a function of distribution of the oscillatory component of the roll position.

25. The rolling mill strip tension apparatus of claim 24 including
    display means for providing a visual indication of the strip tension distribution in a generally transverse direction as a function of the oscillatory components of the actual strip tension signals.

26. The rolling mill strip tension apparatus of claim 15 including
    each said strip contacting roll having its own support arms, hydraulic cylinder, positioning sensing means, pressure sensing means and servo means.

27. The rolling mill strip tension apparatus of claim 1 including
    position regulating means for providing an output to said servo means which contains a value of the oscillation of actual roll position with respect to a predetermined value.

28. The rolling mill strip tension apparatus of claim 1 including
    strip tension regulating means for providing to said servo means an output which contains a value of the oscillation of actual strip tension with respect to a predetermined strip tension base level.

29. A method of controlling rolling mill strip tension profile comprising
    providing a plurality of independent strip contacting rolls which are axially rotatable and each supported independently by support means which are mounted for rotation, actuator means for rotating said roll support means,
    determining at least one function of strip tension with respect to each said roll, and
    comparing said functions for each said roll with respect to desired values of said functions, and when a predetermined departure from desired values exist effecting on a roll by roll basis a change in the position of the actuator means operatively associated with each said roll.

30. The method of claim 29 including
    employing either a roll position or a strip tension as said strip tension functions.

31. The method of claim 30 including
    determining said function utilizing the oscillatory components of either roll position or strip tension values.

32. The method of claim 29 including
    when a said predetermined departure exists effecting a change in a rolling mill gap.

33. The method of claim 29 including
    when a said predetermined departure exists effecting on a roll by roll basis a change in position of the actuator means operatively associated with said roll.

34. The method of claim 29 including determining the position of said actuator means and emitting a corresponding position signal, determining the pressure in said actuator means and emitting a corresponding pressure signal, and determining from said position signals and said pressure signals the strip tension signals profile and the position signals for each said strip contacting roll.

35. The method of claim 34 including employing a first mode which provides predetermined positions of said strip contacting rolls and determines the strip tension profile as a function of the strip tension signals and a second mode which provides predetermined strip tension for each said contacting strip roll and determines the strip tension profile as a function of the positions of said strip contacting rolls.

* * * * *